means such as bushing 41. In accordance with known practice, shaft 36 is coupled with wobble-plate agitator 42 through the agency of an inclined portion (not shown) that extends into rotatable basket 15 and is journalled to the agitator by a suitable bearing (not shown). As has been mentioned, details of construction of the agitator 42 are disclosed and claimed in U.S. Patent 3,102,408.

A selectively operable disk brake means 43 (FIGURE 3) is provided for locking hollow rotatably mounted shaft 33 to the lower region of nonrotatable column 22, while inner agitator shaft 36 is rotated alone, and for unlocking hollow shaft 33, as respects column 22, for rotation simultaneously with solid inner shaft 36. Brake means 43 comprises a ring 44 having an upwardly presented annular facing 45 attached by suitable bracket means 46 to flange portion 32 of nonrotatable column 22, and an actuating disk 50 including a ring-like face portion 51 positioned and adapted to mate with facing 45 of stationary ring 44. Disk 50 is keyed to a sleeve 38, affixed to hollow rotatable shaft 33, by spline means 37 in the region of disk hub section 52. Spline means 37 permits reciprocable axial movements of disk 50 along sleeve 38 of shaft 33, but prevents relative rotational movements between disk 50 and shaft 33. A coil spring 53 encircles hollow rotatable shaft 33 and reacts between a ring 54 attached to sleeve 38 and a shoulder 55 of hub section 52 to urge brake disk 50 downwardly.

The construction and arrangement of brake means 43 is such that hollow shaft 33 is locked to stationary column 22 (FIGURE 3) by permitting spring 53 to urge face 51 of brake disk 50 into engagement with facing 45 of the stationary brake ring 44, and is unlocked from column 22 (FIGURE 4) by causing face 51 of brake 50 to be moved upwardly, against the force of spring 53, and out of frictional engagement with facing 45.

Actuating mechanism for releasing and engaging the brake comprises cam means 56 having an upper cam 60 rotatable and slidable on shaft 36 by means of a bushing 68. Cam 60 is provided with an upper face portion 61 engageable with a downwardly presented face portion 62 of the brake disk hub section 52.

In particular accordance with the present invention, the upper face portion 61 of cam 60 fixedly carries a hollow annular member or drum means 63 concentric with the rotatable shaft 33 and having a sump 69 adapted to contain a fluid 64, as is illustrated in both FIGURES 3 and 4. Fluid 64 is preferably a silicone type oil or fluid of very low volatility to minimize loss by evaporation, and having suitable viscosity over a wide temperature range in order that it may serve as a lubricant and drive coupling for the clutch facings to be described in what follows. The viscosity is such as to promote flow under centrifugal forces created in the rotating elements. A silicone fluid available under the name "Dow-Corning 200 Fluid" has been found suitable for this purpose. It is of course contemplated that other suitable fluids may be used if desired.

A fibrous facing 65, which may for example be rubberized cork, is disposed in the sump 69, and is presented for frictional engagement with the downwardly presented face portion 62 of brake disk hub section 52. This facing 65, along with the face portion 62 of hub section 52 is immersed in the fluid when the mechanism is at rest, as will be the case between reversals of the mechanisms, to be hereinafter more fully described, or when the machine is not in operation.

With reference also to FIGURE 5, facings 65 may comprise three arcuate segments, each mounted upon inclined, arcuate cantilever spring elements 66 affixed at their lower ends by rivet means 70 to a flat ring 67 keyed for rotation with the upper face portion 61 of cam 60. Ring 67 is keyed to cam 60 by recesses 78 formed in a sleeve portion 83 of the ring and disposed to receive embossed portions 79 of a sleeve portion 84 of housing or hollow annular member 63. It will be appreciated that other keying means may be employed. For example, the sleeve portions 83 and 84 may comprise mating hexagonal surfaces that provide a plurality of keying elements. The spring elements 66 in combination with ring 67 anchor facings 65 to cam 60, and the facings are urged by the springs into continuous frictional engagement with the downwardly presented face portion 62 of the brake disk hub section 52.

Cam 60 includes a lower portion provided with a plurality of vertical abutment surfaces 71 and a plurality of generally axially presented helical surfaces 72 coaxially disposed with respect to the agitator shaft. A lower cam 73 keyed to agitator shaft 36 includes abutment surfaces 74 that are presented for engagement with surfaces 71, and helical surfaces 75 that are disposed in sliding engagement with surfaces 72. Also keyed to the agitator shaft 36 is a pulley 76 driven by a belt 77 encircling another pulley 81. A conventional reversible electric motor 82 drives pulley 81, which in turn drives belt 77 and pulley 76.

With particular reference to FIGURE 3, the construction and arrangement is such that rotation of pulley 76 by motor 82 in the "agitate" direction will rotatably drive agitator shaft 36 along with the lower cam 73 according to the directional arrow, causing helical cam surfaces 72 to slide downwardly on helical cam surfaces 75, until vertical surfaces 71 and 74 abut one another, whereby the upper cam 60 moves axially downwardly relative to agitator shaft 36, under the influence of gravity. The downward movement of cam 60 in effect drivingly disengages the clutch facings 65 from face 62, and permits the brake disk 50 to be forced by spring 53 against the brake facing 45 to lock basket 15 from rotation and permit drive of agitator shaft 36 alone. During such driving of shaft 36 alone, the upper cam 60 will be rotatably driven through abutment surfaces 71 and 74, and clutch facings 65 under the urging of springs 66, will slide freely across the downwardly presented hub face 62 of brake disk 50. However, springs 66 will exert insufficient vertical force through facings 65 to raise the brake disk against the brake actuating force exerted by spring 53. This sliding engagement is advantageous in that it prevents sudden impacting of facings 65 against hub face 62 when they are moved upwardly to release the brake, as will be described in what follows. Also while the motor is driving in the agitate direction, fluid 64 is centrifuged, through the communicating intermediate hollow portion of housing 63, to the outer peripheral portion of the housing, as is illustrated at 64a. For convenience in illustration, the fluid is shown at both 64 and 64a. However, the fluid will occupy the position 64 when the apparatus is at rest or during transitions between agitator operation and spinning of the basket.

With reference to FIGURE 4, rotation of pulley 76 in the "spin" direction, according to the directional arrow applied to FIGURE 4, rotates lower cam 73 to cause helical cam surfaces 72 to slide upwardly along helical cam surfaces 75, whereby upper cam 60 is elevated relative to agitator shaft 36 and clutch facings 65 are moved upwardly. Upon initial upward movement, springs 66 are deflected downwardly into abutting engagement with flat ring 67 resting upon and keyed to cam 60, and facings 65 are urged into driving engagement with the downwardly presented hub face 62 of brake disk 50. Upon subsequent, final elevation of cam 60, face 51 of disk 50 is moved upwardly and away from brake facing 45, thereby also compressing and storing energy in spring 53. Releasing the brake 45-51 unlocks basket 15 and permits its rotation in the spin direction under the torsional driving force transmitted through clutch facings 65 keyed to cam 60 and hub face 62, said force being controlled by compressed spring 53. Again, fluid 64 is centrifuged to the outer periphery of housing 63, as illustrated at 64a.

first cam, said cams being relatively slidable upon one another to move said second cam axially toward or away from said first cam when the latter is rotatably driven with said one shaft in either a forward or a reverse sense; hollow drum means coaxial with, and axially movable and rotatably driven by, said second cam, said drum means including a centrally disposed annular sump portion; axially presented friction clutch facing means within said sump portion and driven with said drum means; an annular member driven with the other of said shafts and presented for driving engagement by said friction clutch facing means in response to axial movement of said cam away from said first cam; and a quantity of fluid within said sump portion wetting said clutch facing when said hollow drum means is at rest, said fluid being caused to flow by centrifugal force from said sump portion to peripheral portions of said drum means as it is caused to rotate upon being driven by said reversible drive means, said flow being of a quantity sufficient to leave said clutch facing substantially dry.

7. A clutch mechanism for drivingly connecting a pair of input and output members, including mating portions driven with said members, an annular housing driven with said input member and enclosing said input member and said mating portions, said housing defining an interior, centrally disposed fluid storage chamber and a peripherally disposed chamber extending concentrically about said storage chamber and said members, fluid within said housing, means defining continuous fluid flow communication between said chambers and providing for flow of fluid over said mating portions and from the said storage chamber by centrifugal force, and return of fluid thereto by gravitational force, each said mating portions of said members comprising facing means, one of said facing means being drivingly connected to said housing and disposed within said storage chamber, and means for relatively moving said members axially toward and away from one another, whereby to couple and to decouple said facing means, said input member is caused to rotate, rotation of said input member being operable to centrifuge said fluid from said storage changer into said peripherally disposed chamber.

8. Clutch mechanism according to claim 7, characterized in that said one of said facing means comprises a plurality of arcuate, cantilever spring segments, each mounted at one end thereof upon said storage chamber, and inclined toward the other of said facing means, and friction lining extending over each said spring, each said spring being deflectable toward said storage chamber as said one facing means is moved toward the other of said facing means, said lining engaging the latter means to provide the recited frictional driving engagement, fluid entrapped between the lining and the other of said facing means being progressively forced therefrom and centrifuged into said peripherally disposed chamber, whereby to effect a progressive increase in friction between said facing means.

9. In power transmission apparatus, drive mechanism comprising: a pair of coaxially disposed rotatable shafts; a first cam coupled for rotation with one of said shafts; reversible drive means for driving said first cam; a second cam mating with and rotatably driven by said first cam, and further adapted for relative sliding engagement to move said second cam axially either toward or away from said first cam when the latter is rotatably driven by said drive means in either a forward or a reverse sense; hollow drum means coaxial and rotatably driven with said second cam, said drum means including a centrally disposed annular sump portion; axially presented friction clutch facing means within said sump portion and driven with said drum means; brake disk means driven with the other of said shafts and movable along the axis of the latter, said brake disk means including an annular facing engaged by said friction clutch facing means, and a braking surface portion movable into and out of positions operative to brake said other shaft upon axial movement of said second cam; and a quantity of fluid within said sump portion immersing said clutch facing when said hollow drum means is at rest, said fluid being caused to flow by centrifugal force from said sump portion to peripheral portions of said drum means as it is caused to rotate, whereby to render said clutch facing substantially dry.

10. In power transmission apparatus, drive mechanism comprising: a pair of coaxially disposed rotatable shafts; a first cam coupled for rotation with one of said shafts to be driven thereby; reversible drive means for driving the said one shaft; a second cam mating with and rotatably driven by said first cam, said cams being relatively slidable upon one another to move said second cam axially toward or away from said first cam when the latter is rotatably driven wtih said one shaft in either the forward or the reverse sense; hollow drum means coaxial with, and axially movable and rotatably driven by, said second cam, said drum means including a centrally disposed annular sump portion; an annular member driven with the other of said shafts and coaxial therewith; axially presented friction clutch means within said sump portion and driven with said drum means, said friction clutch means comprising a plurality of arcuate cantilever spring segments, each mounted at an end thereof upon said sump portion, and inclined toward said annular member, and a friction lining carried by said said spring segment, each said spring segment being deflectable toward said sump portion as said drum means is moved toward said annular member by said second cam whereby said friction lining is urged into progressive frictional engagement with said annular member to provide the recited driving engagement; and a quantity of fluid within said sump portion wetting said friction lining when said hollow drum means is at rest, said fluid being caused to flow by centrifugal force from said sump portion to peripheral portions of said drum means as it is caused to rotate upon being driven by said reversible drive means, fluid entrapped between the friction lining and the annular member being progressively forced therefrom and centrifuged to peripheral portions of said drum means, to effect a progressive increase in friction between said friction lining and said annular member.

11. In combined clutching and torque limiting apparatus: opposed, coaxially mounted annular members selectively operable for relative movements toward and away from one another whereby to provide for conjoint and relative rotative movements thereof, respectively, about a vertically extending axis, one of said coaxially mounted members being provided with a plurality of cantilever springs inclined toward said other member, each spring carrying high friction means and being deflectable toward the recited one member as it is moved toward said other member and said friction means is brought into progressive frictional engagement with said other member, engagement of said high friction means with said other member providing for the recited rotative movements of said members; means defining a generally annular housing having an inwardly disposed annular sump portion substantially surrounding one of said members and a liquid tight peripheral portion; and a liquid contained within said annular housing occupying said annular sump portion and wetting at least one of said members when the same are at rest, said annular housing including provision for centrifugally induced radial movement of said liquid away from said annular sump portion and said members and into said peripheral portion, in response to conjoint rotation of said members, whereby to render said one member substantially dry, the construction and arrangement being such that liquid is entrapped between the friction means and said other member and is progressively forced therefrom, in response to the recited progressive engagement of said high friction means, and centrifuged into said peripheral por-